(12) United States Patent
Chung et al.

(10) Patent No.: US 12,060,923 B2
(45) Date of Patent: Aug. 13, 2024

(54) SPEED REDUCER

(71) Applicant: Delta Electronics, Inc., Taoyuan (TW)

(72) Inventors: Chi-Wen Chung, Taoyuan (TW); En-Yi Chu, Taoyuan (TW); Ming-Li Tsao, Taoyuan (TW); Hsien-Lung Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 109 days.

(21) Appl. No.: 17/731,074

(22) Filed: Apr. 27, 2022

(65) Prior Publication Data
US 2023/0095283 A1 Mar. 30, 2023

Related U.S. Application Data

(60) Provisional application No. 63/247,967, filed on Sep. 24, 2021.

(51) Int. Cl.
*F16H 1/32* (2006.01)
(52) U.S. Cl.
CPC ......... *F16H 1/32* (2013.01); *F16H 2001/323* (2013.01); *F16H 2001/327* (2013.01)
(58) Field of Classification Search
CPC ................ F16H 1/32; F16H 2001/323; F16H 2001/327; F16H 49/001
See application file for complete search history.

(56) References Cited

U.S. PATENT DOCUMENTS

| | | | | |
|---|---|---|---|---|
| 2,250,259 | A | * 7/1941 | Foote, Jr. | .................. F16H 1/32 475/180 |
| 3,377,886 | A | * 4/1968 | Frantz | ...................... F16H 1/32 475/162 |
| 3,558,944 | A | * 1/1971 | Verge | .................... H02K 41/06 310/82 |
| 10,520,062 | B2 | 12/2019 | Tsai et al. | |
| 2020/0144888 | A1 | 5/2020 | Chung et al. | |

FOREIGN PATENT DOCUMENTS

| CN | 2534423 Y | 2/2003 |
|---|---|---|
| CN | 103307216 A | 9/2013 |
| CN | 103410924 A | 11/2013 |
| CN | 204403286 U | 6/2015 |
| CN | 208858869 A | 5/2019 |
| CN | 208858869 U | 5/2019 |

(Continued)

*Primary Examiner* — Terence Boes
(74) *Attorney, Agent, or Firm* — KIRTON McCONKIE; Evan R. Witt

(57) ABSTRACT

A speed reducer includes an input shaft, an input gear, a fixing gear and an output gear. The input shaft includes an eccentric structure. The input gear is disposed on the eccentric structure and includes first teeth of which each with a first contact portion and a second contact portion. The fixing gear and the output gear are disposed corresponding to the input gear, wherein the fixing gear includes second teeth, and the second teeth are in contact with the first contact portions, wherein the output gear includes third teeth, and the third teeth are in contact with the second contact portions. A first tooth number difference between the first teeth and the second teeth is different from a second tooth number difference between the first teeth and the third teeth.

7 Claims, 8 Drawing Sheets

(56) References Cited

FOREIGN PATENT DOCUMENTS

| | | | |
|---|---|---|---|
| CN | 110360274 | A | 10/2019 |
| CN | 111103777 | A | 5/2020 |
| CN | 111162631 | A | 5/2020 |
| DE | 3131612 | A1 | 2/1983 |
| DE | 102020104758 | A1 | 8/2020 |
| DE | 102020134973 | A1 | 8/2021 |
| EP | 3081424 | A1 | 10/2016 |
| JP | 2019526760 | A | 9/2019 |
| TW | M591134 | U | 2/2020 |
| TW | 202018209 | A | 5/2020 |
| TW | I704305 | B | 9/2020 |

\* cited by examiner

SPEED REDUCER

CROSS-REFERENCE TO RELATED APPLICATION

This application claims the benefit of U.S. Provisional Application No. 63/247,967 filed on Sep. 24, 2021, and entitled "POWER MODULE AND SPEED REDUCER". The entire contents of the above-mentioned patent applications are incorporated herein by reference for all purposes.

FIELD OF THE INVENTION

The present disclosure relates to a speed reducer, and more particularly to a speed reducer comprising an input gear shared by a fixing gear and an output gear.

BACKGROUND OF THE INVENTION

Generally, a motor is operated at a high speed and a low torque. In other words, it is difficult for the motor to drive a large-sized load. Consequently, for allowing the motor to drive a heavy object, a speed reducer is used for reducing the rotating speed of the motor and increasing the torque.

In order to have a high reduction ratio, the structure of the speed reducer is usually complicated. Therefore, how to effectively improve the utilization of space of the speed reducer, and to maintain a high reduction ratio while reducing the number of the structural elements and the volume of the speed reducer is the focus of the design currently.

The traditional speed reducer usually includes two independent annular input gears so that the speed reducer can achieve a high reduction ratio through the cooperation between the two annular input gears and other components of the speed reducer. However, due to the use of two annular input gears, the traditional speed reducer has the disadvantages of more components, more cost, a larger volume and a poor structural strength.

Therefore, there is a need of providing an improved speed reducer in order to the overcome the above issues.

SUMMARY OF THE INVENTION

An object of the present disclosure provides a speed reducer. Since the speed reducer includes a shared input gear, the speed reducer has the advantages of a high reduction ratio, less components, a smaller volume and a stronger structural strength.

In accordance with an aspect of the present disclosure, a speed reducer is provided. The speed reducer includes an outer or a central type of input shaft, an input gear, a fixing gear and an output gear. The input shaft comprises an eccentric structure. The input gear is disposed on the eccentric structure of the input shaft, wherein the input gear is rotated with the input shaft and eccentrically rotated about an axel center of the input shaft, wherein the input gear comprises a plurality of first teeth, each of the plurality of first teeth comprises a first contact portion and a second contact portion arranged side by side in an axial direction. The fixing gear is disposed fixedly corresponding to the input gear and forming a first gear pair with the input gear, wherein the fixing gear comprises a plurality of second teeth, and each of the plurality of second teeth is in contact with the corresponding first contact portion of the first tooth. The output gear is disposed corresponding to the input gear and adjacent to the fixing gear and forming a second gear pair with the input gear, wherein the output gear comprises a plurality of third teeth, and each of the plurality of third teeth is in contact with the corresponding second contact portion of the first tooth, wherein while the input gear is rotated with the input shaft, the first teeth are pushed against the corresponding third teeth so that the output gear is correspondingly rotated. A first tooth number difference between the first teeth and the second teeth is different from a second tooth number difference between the first teeth and the third teeth.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
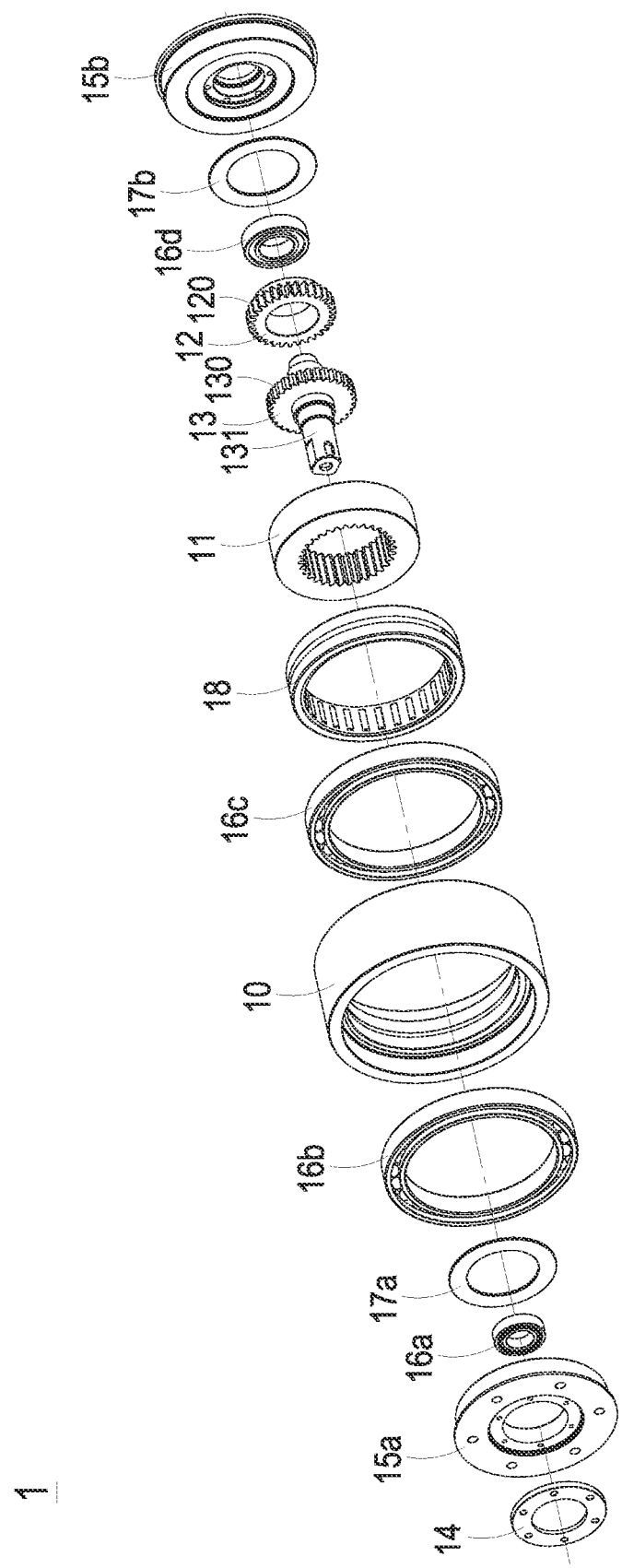
FIG. 1 is a schematic exploded view illustrating a speed reducer according to a first embodiment of the present disclosure.
Figure 2:
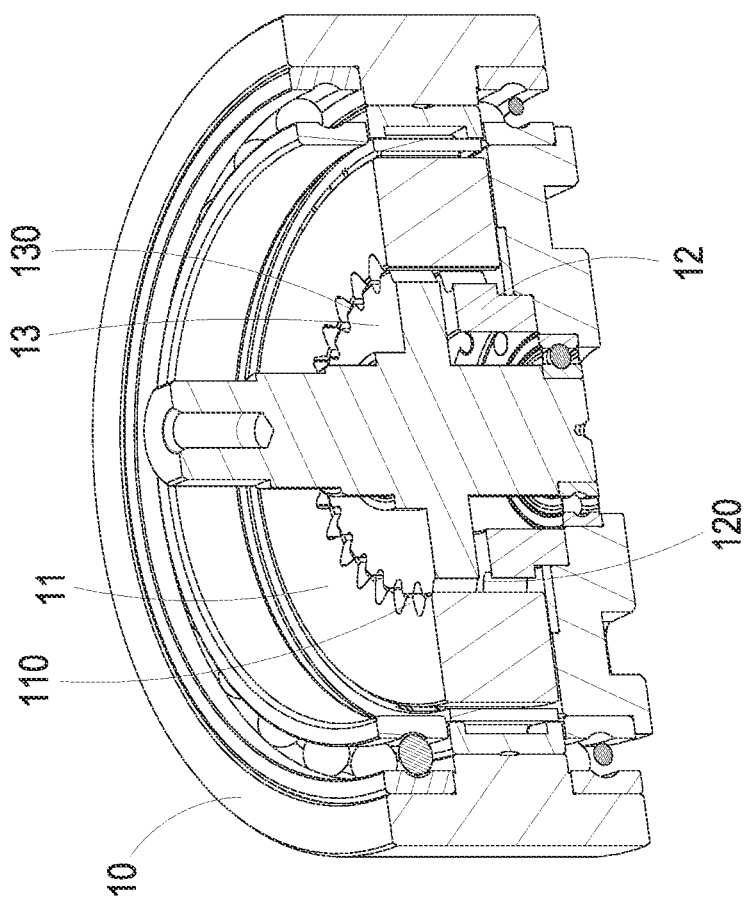
FIG. 2 is a schematic cutaway view illustrating the speed reducer according to the first embodiment of the present disclosure.
Figure 3:
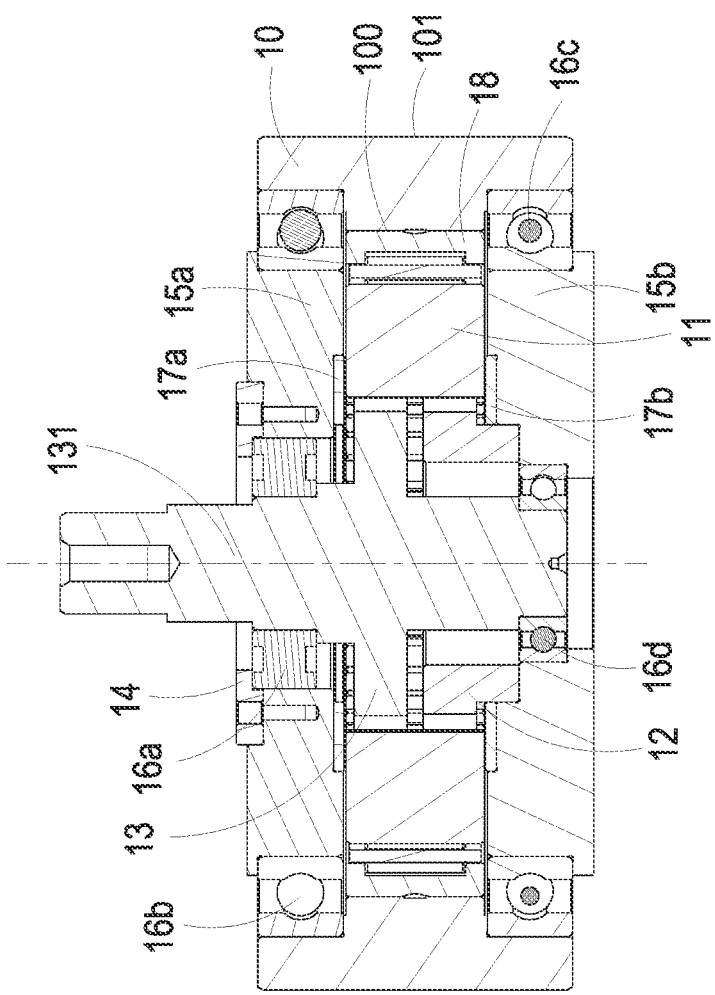
FIG. 3 is a cross-sectional view illustrating the speed reducer according to the first embodiment of the present disclosure.
Figure 4:
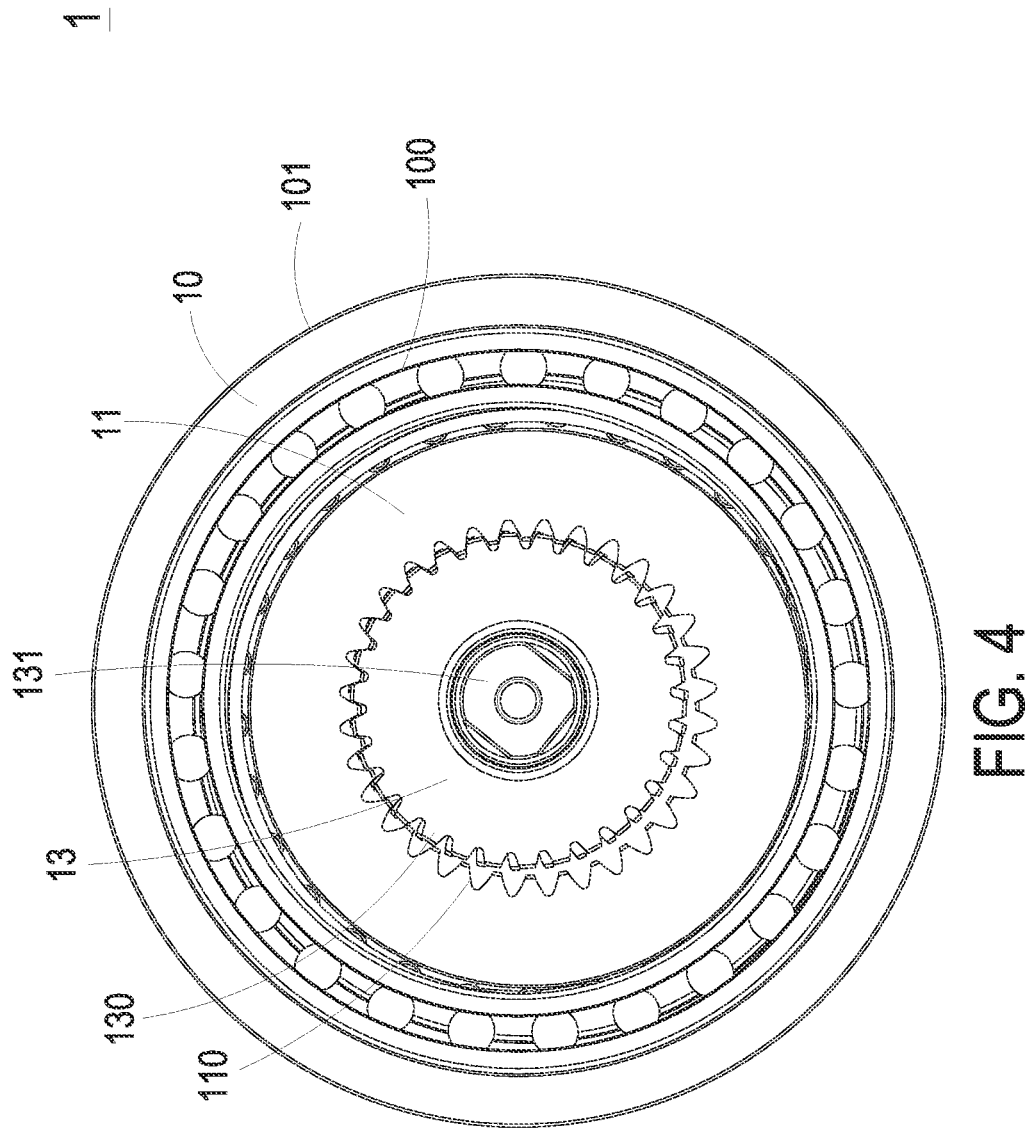
FIG. 4 is a schematic front view illustrating the speed reducer according to the first embodiment of the present disclosure.

Please refer to FIGS. 1, 2, 3 and 4. FIG. 1 is a schematic exploded view illustrating a speed reducer according to a first embodiment of the present disclosure. FIG. 2 is a schematic cutaway view illustrating the speed reducer according to the first embodiment of the present disclosure. FIG. 3 is a cross-sectional view illustrating the speed reducer according to the first embodiment of the present disclosure. FIG. 4 is a schematic front view illustrating the speed reducer according to the first embodiment of the present disclosure. In this embodiment, the speed reducer 1 is a two-stage reducer. The speed reducer 1 includes an input shaft 10, an input gear 11, a fixing gear 12 and an output gear 13. The input shaft 10 is outer type defined by inputting manner and located at the outer side of the overall speed reducer 1. As shown in FIGS. 2 and 3, the input shaft 10 is outer type. The input shaft 10 is ring-shaped and has a first hollow structure. The input shaft 10 includes a ring-shaped inner wall 100 and a ring-shaped outer wall 101. The thicknesses between the ring-shaped inner wall 100 and the ring-shaped outer wall 101 are not the same so that an eccentricity is formed between the ring-shaped inner wall 100 and the ring-shaped outer wall 101 of the input shaft 10. That is, the eccentricity exists between the center of the ring-shaped inner wall 100 and the center of the ring-shaped outer wall 101. Moreover, since the center of the ring-shaped inner wall 100 and the center of the ring-shaped outer wall 101 are eccentric, the input shaft 10 includes an eccentric structure formed by the ring-shaped inner wall 100 and the ring-shaped outer wall 101.

The input gear 11 is accommodated within the first hollow structure of the input shaft 10 and disposed on the eccentric structure of the input shaft 10. While the input shaft 10 is rotated, the input gear 11 is rotated with the input shaft 10 and is eccentrically rotated about the center of the ring-shaped outer wall 101 of the input shaft 10. The input gear 11 includes a second hollow structure and a plurality of first teeth 110. Each of the plurality of first teeth 110 is surrounded and protruded from a ring-shaped inner wall of the input gear 11, and each of the plurality of first teeth 110 includes a first contact portion and a second contact portion arranged side by side in an axial direction. As shown in FIGS. 2 and 3, the first teeth 110 are formed as the inner teeth on the ring-shaped inner wall of the input gear 11 corresponding to the input shaft 10 which is outer type.

The fixing gear 12 is disposed corresponding to the input gear 11. Moreover, the fixing gear 12 is accommodated within the second hollow structure of the input gear 11 and disposed on the ring-shaped inner wall of the input gear 11. The fixing gear 12 is fixed and not rotatable. The fixing gear 12 includes a plurality of second teeth 120. Each of the plurality of second teeth 120 is surrounded and protruded from an outer periphery of the fixing gear 12 towarding to the input gear 11 and in contact with the corresponding first contact portion of the first tooth 110. Besides, the fixing gear 12 forms a first gear pair with the input gear 11.

The output gear 13 is disposed corresponding to the input gear 11 and adjacent to the fixing gear 12. Moreover, the output gear 13 is accommodated within the second hollow structure of the input gear 11 and disposed on the ring-shaped inner wall of the input gear 11. The output gear 13 includes a plurality of third teeth 130. Each of the plurality of third teeth 130 is surrounded and protruded from an outer periphery of the output gear 13 towarding to the input gear 11 and in contact with the corresponding second contact portion of the first tooth 110. While the input gear 11 is rotated with the input shaft 10, the first teeth 110 are pushed against the corresponding third teeth 130. Consequently, the output gear 13 is correspondingly rotated. Besides, the output gear 13 forms a second gear pair with the input gear 11. Moreover, there is a first tooth number difference formed between the first teeth 110 and the second teeth 120. There is a second tooth number difference formed between the first teeth 110 and the third teeth 130. The first tooth number difference is different from the second tooth number difference.

In accordance with the present disclosure, the fixing gear 12 and the output gear 13 of the speed reducer 1 share with the single input gear 11. Consequently, compared with the traditional speed reducer with two independent annular input gears, the speed reducer 1 not only has the high reduction ratio, but also has the advantages of less components, lower cost, a smaller volume and a stronger structural strength due to the use of the shared single input gear 11. Besides, the speed reducer 1 can avoid the problem about complicated machining the inner teeth since the use of the shared single input gear 11. Moreover, since the speed reducer 1 includes the fixing gear 12, so that the input gear 11 of the speed reducer 1 does not require the design of fixing holes or indexing holes as the traditional speed reducer. Consequently, the volume along a radial direction of the speed reducer 1 is reduced.

In this embodiment, the input shaft 10 is a power input terminal of the speed reducer 1, wherein a rotation speed of the input shaft 10 is defined as an input speed of the speed reducer 1. The output gear 13 is a power output terminal of the speed reducer 1, wherein a rotation speed of the output gear 13 is defined as an output speed of the speed reducer 1. Besides, the reduction ratio of the speed reducer 1 is equal to a ratio calculated by dividing the number of teeth on the larger gear by the number of teeth on the smaller gear, and can be expressed as the following formulas:

$$S_{out} = S_{in} \times \frac{(TC2 - TB1) \times (TB1 - TA1)}{TB1 \times TC1};$$

Wherein $TA1 = \frac{TA}{TCA}$, $TB1 = \frac{TB}{TCB}$, $TC1 = \frac{TC}{TCA}$, $TC2 = \frac{TC}{TCB}$;

Wherein $S_{out}$ is the output speed of the speed reducer 1, $S_{in}$ is the input speed of the speed reducer 1, TA is the number of the second teeth 120, TB is the number of the third teeth 130, TC is the number of the first teeth 110, TCA is the first tooth number difference and TCB is the second tooth number difference. The tooth number difference of any two of the first teeth 110, the second teeth 120 and the third teeth 130 is one to two teeth. For example, the number of the first tooth number difference is one tooth, and the number of the second tooth number difference is two teeth.

In case that the number of the second teeth 120 (TA) is 31 teeth, the number of the third teeth 130 (TB) is 30 teeth and the number of the first teeth 110 (TC) is 32 teeth, according to the above formula, TA1=31/1=31, TB1=30/2=15, TC1=32/1=32, TC2=32/2=16. Therefore, $$S_{out} = S_{in} \times \frac{(16 - 15) \times (15 - 31)}{15 \times 32} = S_{in} \times \frac{-1}{30},$$

wherein the negative sign indicates that the input shaft 10 and the output gear 13 rotate in opposite directions.

In some embodiments, the tooth number difference of any two of the first teeth 110, the second teeth 120 and the third teeth 130 is two to four teeth. For example, the number of the first tooth number difference is two teeth, and the number of the second tooth number difference is four teeth. Therefore, in case that the number of the second teeth 120 (TA) is 70 teeth, the number of the third teeth 130 (TB) is 68 teeth and the number of the first teeth 110 (TC) is 72 teeth, the number of the first tooth number difference is two teeth, and the number of the second tooth number difference is four teeth, and according to the above formula, TA1=70/2=35, TB1=68/4=17, TC1=72/2=36, TC2=72/4=18. Therefore, $$S_{out} = S_{in} \times \frac{(18 - 17) \times (17 - 35)}{17 \times 36} = S_{in} \times \frac{-1}{34},$$

wherein the negative sign indicates that the input shaft 10 and the output gear 13 rotate in opposite directions.

In some embodiments, the output gear 13 further includes an output shaft 131 extending from a center of the output gear 13 to the two opposite outer sides. While the output gear 13 is rotated, the output shaft 131 is rotated with the output gear 13.

In some embodiments, the speed reducer 1 further includes a cover 14, a first fixing base 15a, a first ball bearing 16a, a first washer 17a, a second ball bearing 16b, a third ball bearing 16c, a needle bearing 18, a fourth ball bearing 16d, a second washer 17b and a second fixing base 15b. The first fixing base 15a and the second fixing base 15b are located at the opposite outer sides of the speed reducer 1 in the axial direction, wherein the fixing gear 12 is fixedly connected with the second fixing base 15b. The first fixing base 15a includes a third hollow structure, and the second fixing base 15b includes a fourth hollow structure. One part of the output shaft 131 is penetrated through the third hollow structure of the first fixing base 15a, and another part of the output shaft 131 is penetrated through the fourth hollow structure of the second fixing base 15b. The cover 14 is disposed on the outer surface of the first fixing base 15a to cover one side of the third hollow structure. The first ball bearing 16a is disposed in the third hollow structure of the first fixing base 15a and arranged between the first fixing base 15a and the output shaft 131. The fourth ball bearing 16d is disposed in the fourth hollow structure of the second fixing base 15b and arranged between the second fixing base 15b and the output shaft 131. The output shaft 131 is rotatable within the third hollow structure of the first fixing base 15a and the fourth hollow structure of the second fixing base 15b through the first ball bearing 16a and the fourth ball bearing 16d. The second ball bearing 16b is disposed in the first hollow structure of the input shaft 10 and arranged between the first fixing base 15a and the input shaft 10. The third ball bearing 16c is disposed in the first hollow structure of the input shaft 10 and arranged between the second fixing base 15b and the input shaft 10. The first washer 17a is disposed between the first fixing base 15a and the input gear 11. The second washer 17b is disposed between the second fixing base 15b and the input gear 11. The needle bearing 18 is disposed in the first hollow structure of the input shaft 10 and arranged between the input gear 11 and the input shaft 10. The input shaft 10 is rotatable through the second ball bearing 16b, the third ball bearing 16c and the needle bearing 18.

Figure 5:
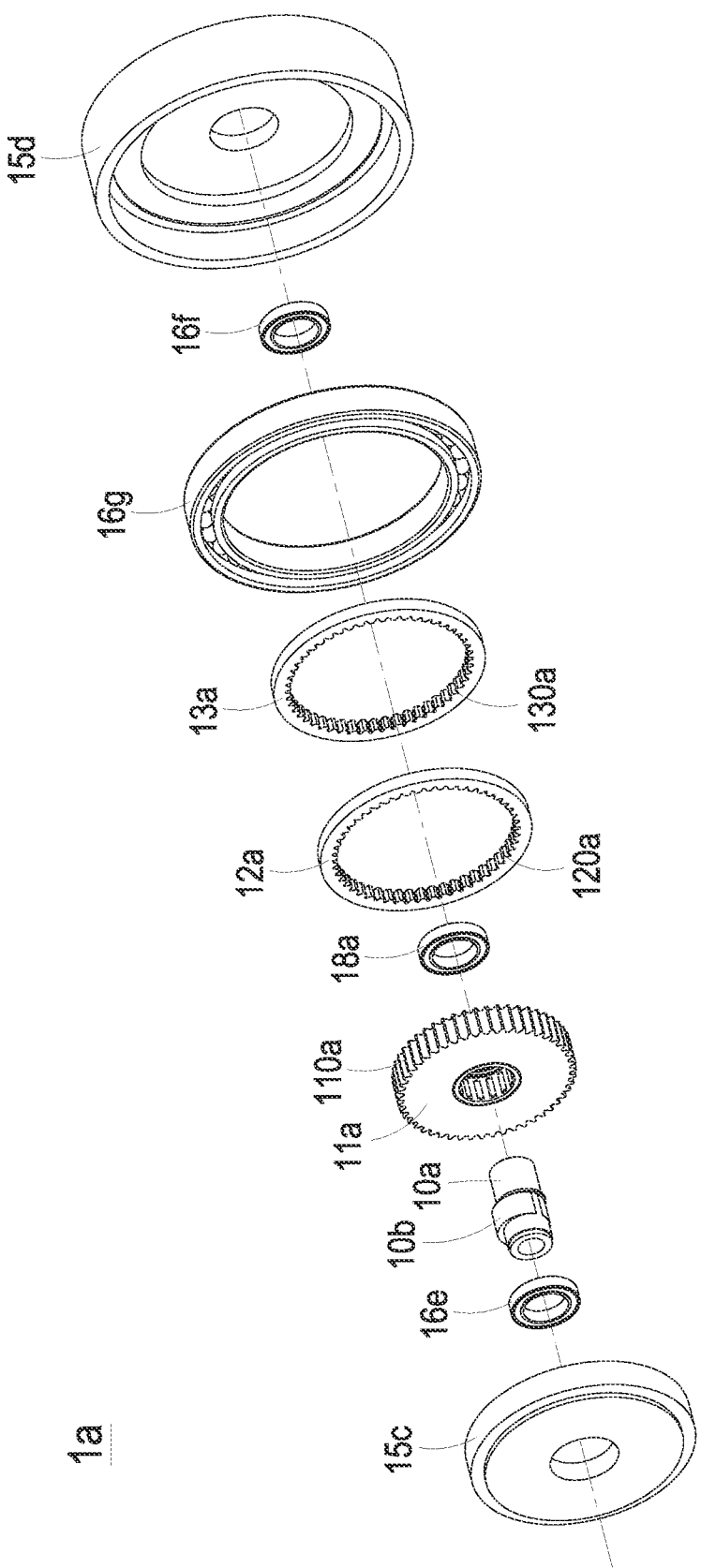
FIG. 5 is a schematic exploded view illustrating a speed reducer according to a second embodiment of the present disclosure.
Figure 6:
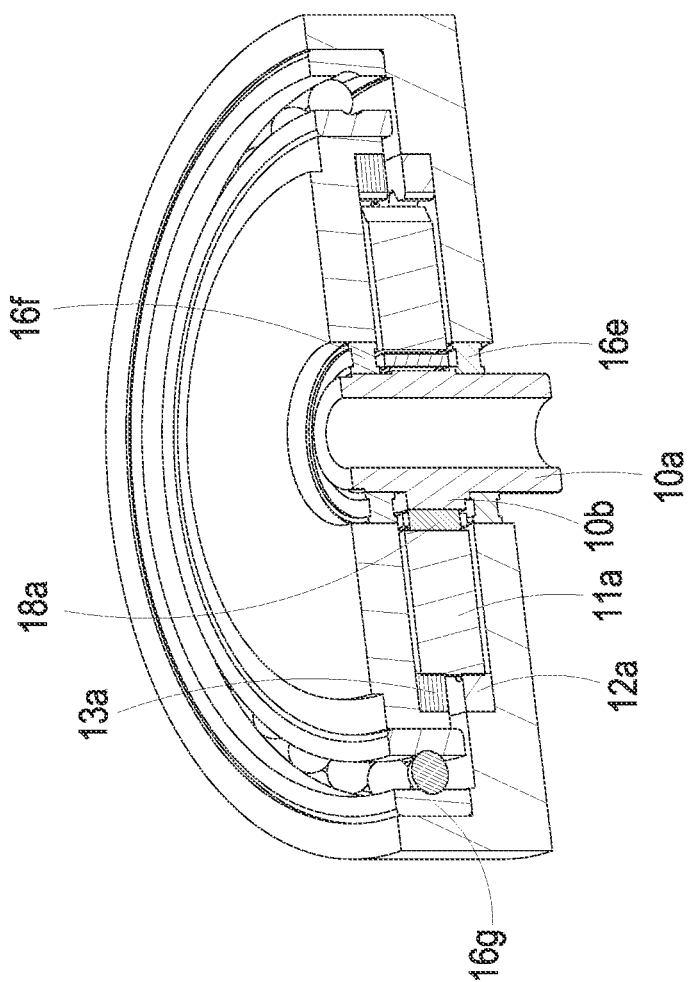
FIG. 6 is a schematic cutaway view illustrating the speed reducer according to the second embodiment of the present disclosure.
Figure 7:
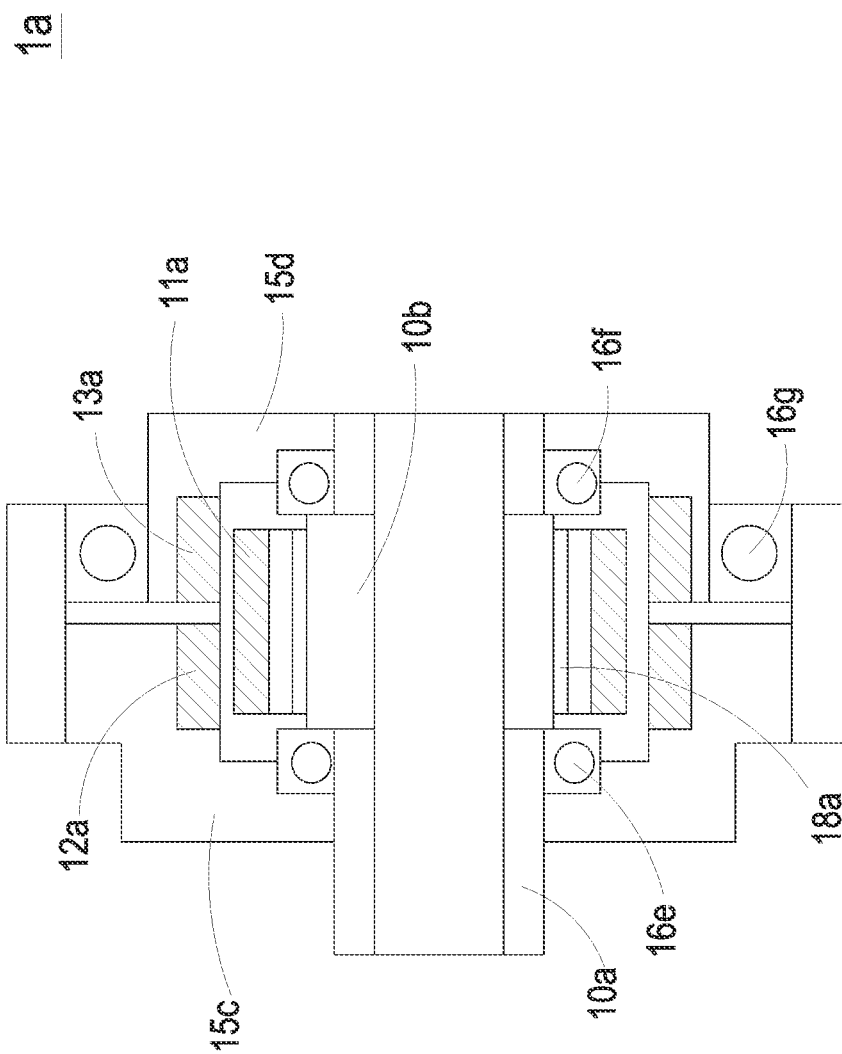
FIG. 7 is a cross-sectional view illustrating a speed reducer according to the second embodiment of the present disclosure.
Figure 8:
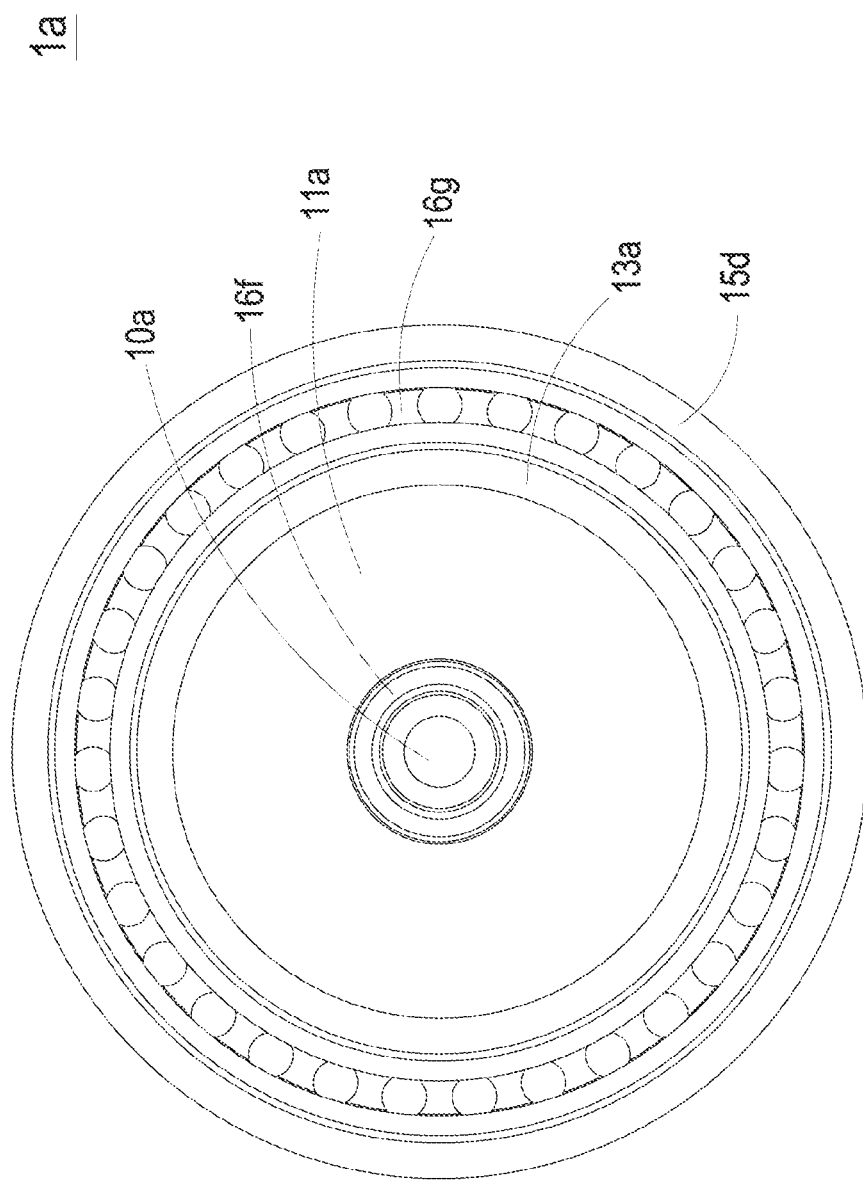
FIG. 8 is a schematic front view illustrating the speed reducer according to the second embodiment of the present disclosure.

Please refer to FIGS. 5, 6, 7 and 8. FIG. 5 is a schematic exploded view illustrating a speed reducer according to a second embodiment of the present disclosure. FIG. 6 is a schematic cutaway view illustrating the speed reducer according to the second embodiment of the present disclosure. FIG. 7 is a cross-sectional view illustrating a speed reducer according to a second embodiment of the present disclosure. FIG. 8 is a schematic front view illustrating the speed reducer according to the second embodiment of the present disclosure. Since the structure and the operation of the speed reducer 1a of this embodiment are similar to those of the first embodiment, the following description only uses the cross-sectional view shown in FIG. 5 to explain the speed reducer 1a. The speed reducer 1a is a two-stage reducer. The speed reducer 1a includes an input shaft 10a, an input gear 11a, a fixing gear 12a and an output gear 13a. The input shaft 10a is central type defined by inputting manner and located at a center of the overall speed reducer 1a. The input shaft 10a includes an eccentric structure 10b. The eccentric structure 10b is eccentrically fixed on the input shaft 10a. While the input shaft 10a is rotated, the eccentric structure 10b is rotated with the input shaft 10a and eccentrically rotated about the axle center of the input shaft 10a.

The input gear 11a includes a first hollow structure, a ring-shaped inner wall, a ring-shaped outer wall and a plurality of first teeth 110a. The eccentric structure 10b is disposed in the first hollow structure. Consequently, while the eccentric structure 10b is rotated with the input shaft 10a, the input gear 11a is rotated with the eccentric structure 10b. The plurality of first teeth 110a are surrounded and protruded from the ring-shaped outer wall of the input gear 11a, and each of the plurality of first teeth 110a includes a first contact portion and a second contact portion arranged side by side in an axial direction. Besides, the first teeth 110a are formed as the outer teeth on the ring-shaped outer wall of the input gear 11a corresponding to the input shaft 10a which is central type.

The fixing gear 12a is disposed corresponding to the input gear 11a and includes a second hollow structure. Moreover, the fixing gear 12a is disposed on the ring-shaped outer wall of the input gear 11a so that one part of the input gear 11a is accommodated within the second hollow structure of the fixing gear 12a. The fixing gear 12a is fixed and not rotatable. The fixing gear 12a includes a plurality of second teeth 120a. Each of the plurality of second teeth 120a is surrounded and protruded from an inner periphery of the fixing gear 12a towarding to the input gear 11a and in contact with the corresponding first contact portion of the first tooth 110a. Besides, the fixing gear 12a forms a first gear pair with the input gear 11a.

The output gear 13a is disposed corresponding to the input gear 11a and adjacent to the fixing gear 12a, and the output gear 13a includes a third hollow structure. Moreover, the output gear 13a is disposed on the ring-shaped outer wall of the input gear 11a so that another part of the input gear 11a is accommodated within the third hollow structure of the output gear 13a. The output gear 13a includes a plurality of third teeth 130a. Each of the plurality of third teeth 130a is surrounded and protruded from an inner periphery of the output gear 13a towarding to the input gear 11a and in contact with the corresponding second contact portion of the first tooth 110a. While the input gear 11a is rotated with the input shaft 10a, the first teeth 110a are pushed against the corresponding third teeth 130a. Consequently, the output gear 13a is correspondingly rotated. Besides, the output gear 13a forms a second gear pair with the input gear 11a. Moreover, there is a first tooth number difference formed between the first teeth 110a and the second teeth 120a. There is a second tooth number difference formed between the first teeth 110a and the third teeth 130a. The first tooth number difference is different from the second tooth number difference.

In accordance with the present disclosure, the fixing gear 12a and the output gear 13a of the speed reducer 1a share with the single input gear 11a. Consequently, compared with the traditional speed reducer with two independent annular gears, the speed reducer 1a not only has the high reduction ratio, but also has the advantages of less components, lower cost, a smaller volume and a stronger structural strength due to the use of the shared single input gear 11a. Besides, since the speed reducer 1a includes the fixing gear 12a and the input gear 13a, the speed reducer 1a does not require the design of fixing holes or indexing holes as the traditional speed reducer. Consequently, the volume along a radial direction of the speed reducer 1a is reduced.

In this embodiment, the input shaft 10a is a power input terminal of the speed reducer 1a, and the output gear 13a is a power output terminal of the speed reducer 1a. Wherein a rotation speed of the input shaft 10a is defined as an input speed of the speed reducer 1a, and a rotation speed of the output gear 13a is defined as an output speed of the speed reducer 1a. Besides, the reduction ratio of the speed reducer 1 is equal to the following formula:

$$S_{out} = S_{in} \times \frac{(TA1 - TC1) \times (TC1 - TC2)}{TC1 \times TB1};$$

$$TA1 = \frac{TA}{TCA}, \; TB1 = \frac{TB}{TCB}, \; TC1 = \frac{TC}{TCA}, \; TC2 = \frac{TC}{TCB};$$

Wherein $S_{out}$ is the output speed of the speed reducer 1a, $S_{in}$, is the input speed of the speed reducer 1a, TA is the number of the second teeth 120a, TB is the number of the third teeth 130a, TC is the number of the first teeth 110a, TCA is the first tooth number difference, and TCB is the second tooth number difference. The tooth number difference of any two of the first teeth 110a, the second teeth 120a and the third teeth 130a is one to two teeth. For example, the number of the first tooth number difference is one tooth, and the number of the second tooth number difference is two teeth.

In case that the number of the second teeth 120a (TA) is 31 teeth, the number of the third teeth 130a (TB) is 32 teeth and the number of the first teeth 110a (TC) is 30 teeth, according to the above formula, TA1=31/1=31, TB1=32/2=16, TC1=30/1=30, TC2=30/2=15. Therefore, $$S_{out} = S_{in} \times \frac{(31-30) \times (30-15)}{30 \times 16} = S_{in} \times \frac{1}{32}.$$

In some embodiments, the tooth number difference of any two of the first teeth 110a, the second teeth 120a and the third teeth 130a is two to four teeth. For example, the number of the first tooth number difference is two teeth, and the number of the second tooth number difference is four teeth. Therefore, in case that the number of the second teeth 120a (TA) is 68 teeth, the number of the third teeth 130a (TB) is 70 teeth and the number of the first teeth 130a (TC) is 72 teeth, according to the above formula, TA1=68/4=17, TB1=70/2=35, TC1=72/4=18, TC2=72/2=36. Therefore, $$S_{out} = S_{in} \times \frac{(17-18) \times (18-36)}{18 \times 35} = S_{in} \times \frac{1}{35}.$$

In some embodiments, the speed reducer 1a further includes a fixing base 15c, a first ball bearing 16e, a second ball bearing 16f, a third ball bearing 16g, a needle bearing 18a and an output disc 15d. The fixing base 15c and the output disc 15d are located at the opposite outer sides of the speed reducer 1a in the axial direction, wherein the fixing gear 12a is fixedly connected with the fixing base 15c, and the output gear 13a is connected with the output disc 15d. While the output gear 13a is rotated, the output disc 15d is rotated with the output gear 13a. The fixing base 15c includes a fourth hollow structure, and the output disc 15d includes a fifth hollow structure. One part of the input shaft 10a is penetrated through the fourth hollow structure of the fixing base 15c, and another part of the input shaft 10a is penetrated through the fifth hollow structure of the output disc 15d. The first ball bearing 16e is disposed in the fourth hollow structure of the fixing base 15c and arranged between the fixing base 15c and the input shaft 10a. The second ball bearing 16f is disposed in the fifth hollow structure of the output disc 15d and arranged between the output disc 15d and the input shaft 10a. The input shaft 10a is rotatable within the fourth hollow structure of the fixing base 15c and the fifth hollow structure of the output disc 15d through the first ball bearing 16e and the second ball bearing 16f. The third ball bearing 16g is arranged between the fixing base 15c and the output disc 15d. The output disc 15d is rotatable through the third ball bearing 16g. The needle bearing 18a is disposed in the first hollow structure of the input gear 11a and arranged between the input gear 11a and the eccentric structure 10b. The input gear 11a is rotatable through the needle bearing 18a.

From the above descriptions, the present disclosure provides a speed reducer. The fixing gear and the output gear of the speed reducer share with the single input gear. Consequently, compared with the traditional speed reducer with two independent annular input gears, the speed reducer not only has the high reduction ratio, but also has the advantages of less components, lower cost, a smaller volume and a stronger structural strength due to the use of the shared single input gear. Moreover, since the speed reducer includes the fixing gear, the input gear of the speed reducer does not require the design of fixing holes or indexing holes as the traditional speed reducer. Consequently, the volume along a radial direction of the speed reducer is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed reducer, comprising:
an input shaft which is an outer input shaft, wherein the input shaft comprises an eccentric structure;
an input gear disposed on the eccentric structure of the input shaft, wherein the input gear is rotated with the input shaft and eccentrically rotated about an axle center of the input shaft, wherein the input gear comprises a plurality of first teeth, each of the plurality of first teeth comprises a first contact portion and a second contact portion arranged side by side in an axial direction, wherein the plurality of first teeth are formed as inner teeth;
a fixing gear disposed fixedly corresponding to the input gear and forming a first gear pair with the input gear, wherein the fixing gear comprises a plurality of second teeth, and each of the plurality of second teeth is in contact with the corresponding first contact portion of the first tooth; and
an output gear disposed corresponding to the input gear and adjacent to the fixing gear and forming a second gear pair with the input gear, wherein the output gear comprises a plurality of third teeth, and each of the plurality of third teeth is in contact with the corresponding second contact portion of the first tooth, wherein while the input gear is rotated with the input shaft, the first teeth are pushed against the corresponding third teeth, so that the output gear is correspondingly rotated;
wherein a first tooth number difference between the first teeth and the second teeth is different from a second tooth number difference between the first teeth and the third teeth, and wherein the fixing gear is fixedly connected with a fixing base, wherein the input gear is accommodated within the input shaft, wherein each of the plurality of first teeth is surrounded and protruded from a ring-shaped inner wall of the input gear.

2. The speed reducer according to claim 1, wherein a tooth number difference of any two of the first teeth, the second teeth and the third teeth is one to two or two to four teeth.

3. The speed reducer according to claim 2, wherein a reduction ratio of the speed reducer is equal to the following formula:

$$S_{out} = S_{in} \times \frac{((TC2 - TB1) \times (TB1 - TA1))}{TB1 \times TC1};$$

wherein $TA1 = \frac{TA}{TCA}$, $TB1 = \frac{TB}{TCB}$, $TC1 = \frac{TC}{TCA}$, $TC2 = \frac{TC}{TCB}$;

wherein S_out is an output speed of the speed reducer, S_in is an input speed of the speed reducer, TA is a number of the second teeth, TB is a number of the third teeth, TC is a number of the first teeth, TCA is the first tooth number difference and TCB is the second tooth number difference.

4. The speed reducer according to claim 3, wherein the number of the first tooth number difference is one tooth or two teeth, and the number of the second tooth number difference is two teeth or four teeth.

5. The speed reducer according to claim 3, wherein the input shaft comprises a ring-shaped inner wall and a ring-shaped outer wall, wherein an eccentricity is formed between the ring-shaped inner wall and the ring-shaped outer wall, so that forms the eccentric structure.

6. The speed reducer according to claim 1, wherein the fixing gear is accommodated within the input gear and disposed on the ring-shaped inner wall of the input gear, wherein each of the plurality of second teeth is surrounded and protruded from an outer periphery of the fixing gear.

7. The speed reducer according to claim 6, wherein the output gear is accommodated within the input gear and disposed on the ring-shaped inner wall of the input gear, wherein each of the plurality of third teeth is surrounded and protruded from an outer periphery of the output gear.

* * * * *